United States Patent
Gage

(10) Patent No.: US 9,771,749 B2
(45) Date of Patent: Sep. 26, 2017

(54) APPARATUS AND METHODS FOR DOOR ASSEMBLIES OF VEHICLES

(71) Applicant: Toyota Motor Engineering & Manufacturing North America, Inc., Erlanger, KY (US)

(72) Inventor: Sergei I. Gage, Redford, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 0 days.

(21) Appl. No.: 14/958,215

(22) Filed: Dec. 3, 2015

(65) Prior Publication Data

US 2017/0159340 A1 Jun. 8, 2017

(51) Int. Cl.
*E05F 5/02* (2006.01)
*B60J 5/04* (2006.01)
*E05F 5/06* (2006.01)
*E05F 5/08* (2006.01)

(52) U.S. Cl.
CPC .............. *E05F 5/025* (2013.01); *B60J 5/0493* (2013.01); *E05F 5/02* (2013.01); *E05F 5/022* (2013.01); *E05F 5/06* (2013.01); *E05F 5/08* (2013.01); *E05Y 2201/21* (2013.01); *E05Y 2900/531* (2013.01)

(58) Field of Classification Search
CPC ...................................................... Y10T 16/62
USPC ........................................... 296/187.12, 207
See application file for complete search history.

(56) References Cited

U.S. PATENT DOCUMENTS

| | | | | |
|---|---|---|---|---|
| 2,046,612 A | * | 7/1936 | Devereaux | E05F 5/025 16/85 |
| 2,054,449 A | * | 9/1936 | Williams | E05F 5/025 16/85 |
| 3,819,228 A | * | 6/1974 | Cornacchia | B60J 5/0458 292/DIG. 65 |
| 3,989,287 A | * | 11/1976 | Sheesley | E05B 77/48 16/84 |
| 4,369,696 A | | 1/1983 | Klatt et al. | |
| 7,021,697 B2 | * | 4/2006 | Bodin | B60J 5/0448 296/146.6 |
| 9,290,979 B1 | * | 3/2016 | Alexander | E05F 5/022 |
| 2008/0272621 A1 | | 11/2008 | Racine | |
| 2014/0091600 A1 | * | 4/2014 | Lusky | E05F 5/022 296/207 |
| 2016/0076294 A1 | * | 3/2016 | Alexander | E05F 5/022 16/86 R |

FOREIGN PATENT DOCUMENTS

| | | |
|---|---|---|
| GB | 112646 | 2/1918 |
| GB | 451531 | 8/1936 |
| KR | 245458 | 3/2000 |
| KR | 831939 | 5/2008 |

* cited by examiner

*Primary Examiner* — Katherine Mitchell
*Assistant Examiner* — Marcus Menezes
(74) *Attorney, Agent, or Firm* — Dinsmore & Shohl LLP

(57) ABSTRACT

Apparatus, methods and vehicles for door assembles for vehicles are disclosed. A door assembly of a vehicle includes a damping assembly comprising a damping component arranged on a shut face panel of a vehicle door, and a latch assembly arranged on the shut face panel of the vehicle door, where the damping assembly is configured to transition from an initial state to a shock absorbing state as the vehicle closes the vehicle door against a vehicle body before the latch assembly latches the vehicle door to the vehicle body.

14 Claims, 5 Drawing Sheets

APPARATUS AND METHODS FOR DOOR ASSEMBLIES OF VEHICLES

TECHNICAL FIELD

The present specification generally relates to apparatus and methods for door assemblies of vehicles. Specifically, the embodiments relate to a door assembly including a damping assembly configured to absorb a shock when a vehicle door is closed against a vehicle body.

BACKGROUND

Vehicle door assemblies typically include latch assemblies that are used to latch a vehicle door in a closed configuration. From an open configuration, the vehicle door may be urged toward the closed configuration. Before the vehicle door is closed, the latch assembly engages, which tends to decelerate the closing of the vehicle door. It is desirable to provide vehicle doors with damping assemblies to absorb shock as the vehicle door reaches the closed configuration.

SUMMARY

In one embodiment, a door assembly of a vehicle includes a damping assembly, the damping assembly comprises a damping component arranged on a shut face panel of a vehicle door, and a latch assembly arranged on the shut face panel of the vehicle door, where the damping assembly is configured to transition from an initial state to a shock absorbing state while the vehicle door closes against a vehicle body, and before the latch assembly latches the vehicle door to the vehicle body.

In another embodiment, a method of absorbing shock while closing a vehicle door against a vehicle body includes closing the vehicle door towards the vehicle body with a damping assembly in an initial state, transitioning the damping assembly from the initial state to a shock absorbing state as the vehicle door closes, and absorbing a shock with the damping assembly in the shock absorbing state, where the shock is absorbed while the vehicle door is being closed against the vehicle body, and before a latch assembly latches the vehicle door to the vehicle body.

In another embodiment, a vehicle with a door assembly includes a vehicle body, and at least one vehicle door. The door assembly includes a damping assembly, the damping assembly comprising a damping component that is arranged on a shut face panel of the at least one vehicle door, and a latch assembly arranged on the shut face panel of the at least one vehicle door, where the damping assembly is configured to transition from an initial state to a shock absorbing state as the vehicle closes the at least one vehicle door against a vehicle body before the latch assembly latches the vehicle door to the vehicle body.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 1:
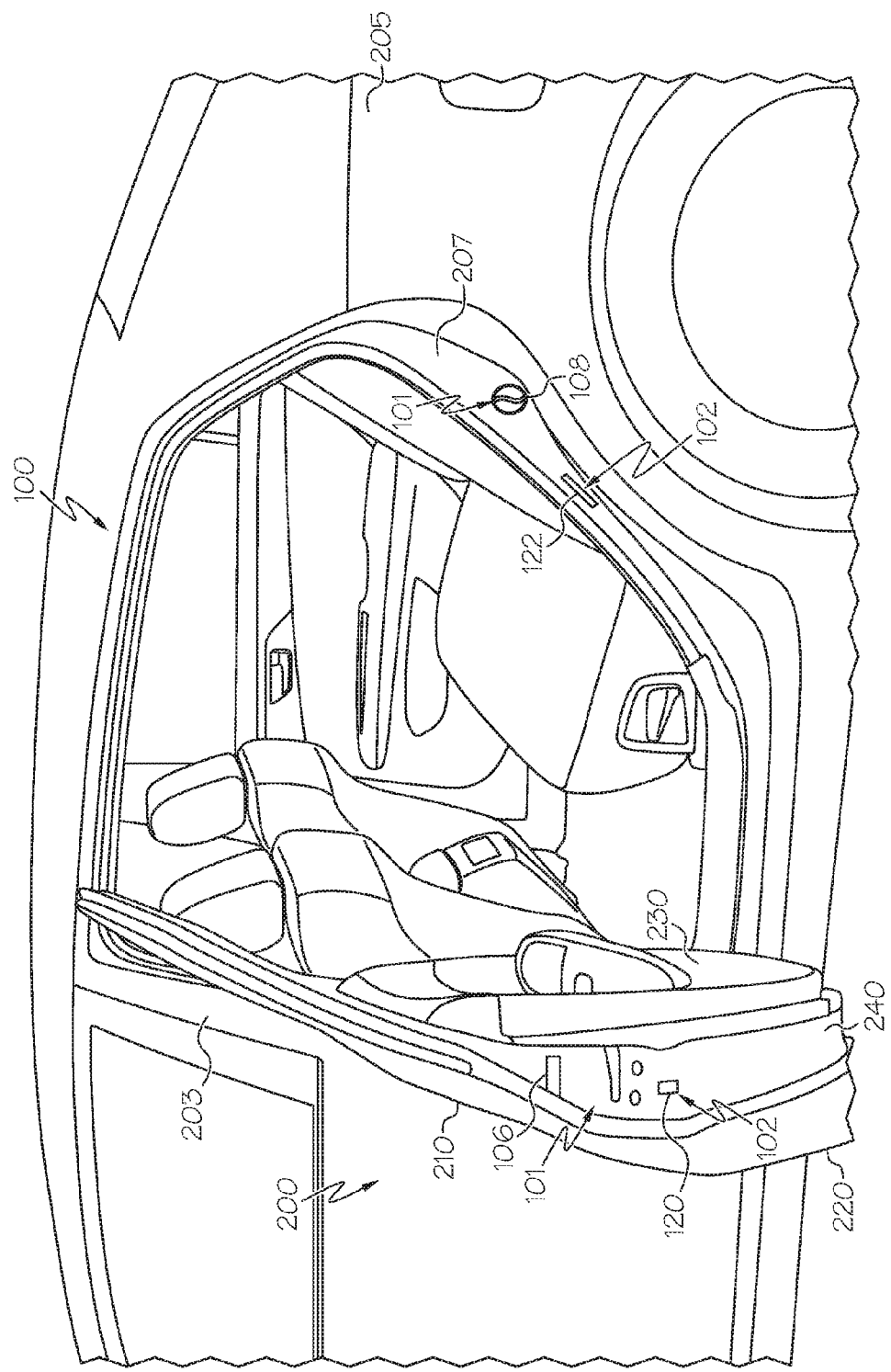
FIG. 1 depicts a door assembly with a vehicle door in an open configuration, according to one or more embodiments shown and described herein.
Figure 2:
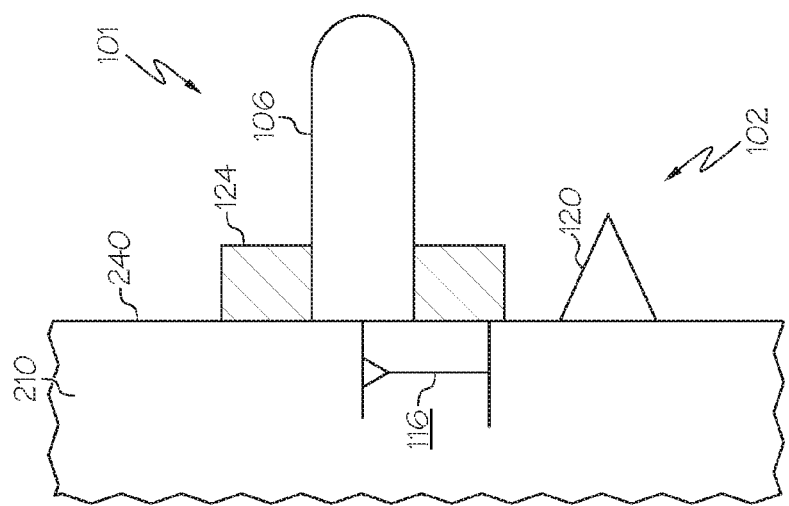
FIG. 2 depicts a detailed view of the door assembly of FIG. 1 including a damping assembly, according to one or more embodiments shown and described herein.
Figure 2:
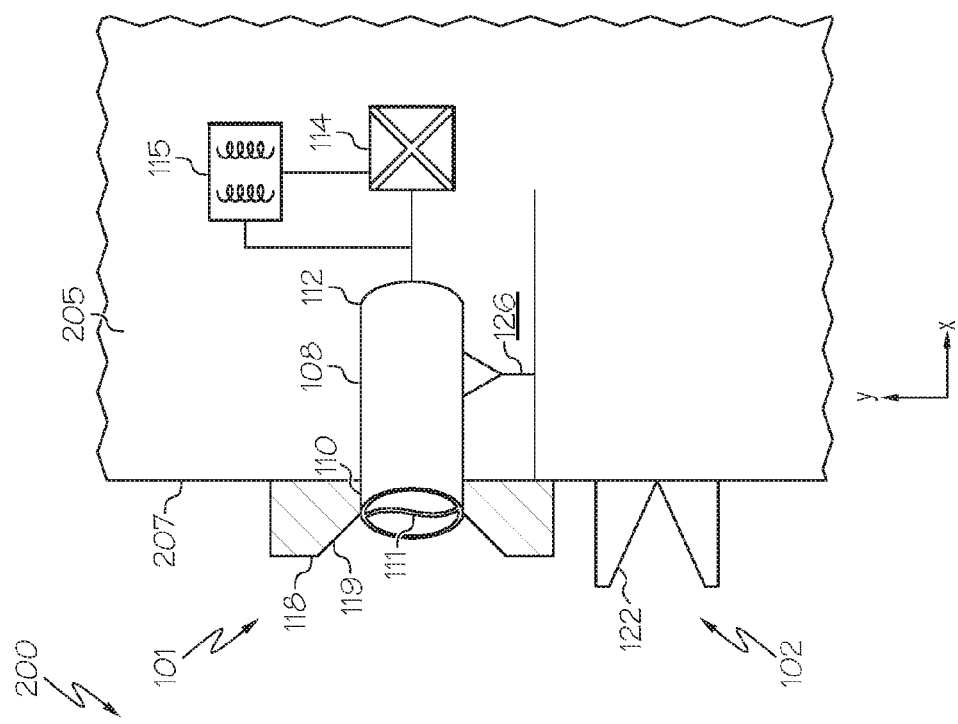

Embodiments disclosed herein are related to apparatus and methods for door assemblies of vehicles that absorb a shock while a vehicle door is closed against a vehicle body. Referring generally to FIGS. 1 and 2, a door assembly of a vehicle and its various components are depicted. The door assembly has a damping assembly and a latching mechanism. The damping assembly includes a first damping component, and a second damping component. The first damping component may be a head component having a pre-selected length. The second damping component may be a jacket component, where the head component is received by the jacket component in the shock absorbing state. The damping assembly is in an initial state, where the head component is at a distance from the jacket component. As the vehicle door closes, the damping assembly transitions from an initial state to a shock absorbing state. In the shock absorbing state, the jacket component receives the head component at the first end of the jacket component, before a latching assembly latches to the vehicle door to the vehicle body. As the damping assembly transitions from the initial state to the shock absorbing state, the shock caused by the oncoming vehicle door against the vehicle body is reduced.

By absorbing the shock, the door assembly can inhibit effects that may be caused to the vehicle body, when the vehicle door closed against the vehicle body with increased force. Irrespective of the amount of force applied, the door assembly is configured to absorb at least a portion of the shock caused by the oncoming vehicle door against the vehicle body before the latching mechanism latches the vehicle door to the vehicle body.

As used herein, a "shock" is a sudden acceleration caused by an impact. When acceleration takes place in a short period of time, the shock provided may or may not have an effect on the components. Shock is a vector that has units of acceleration, such as $m/s^2$, and can be measured using any suitable accelerometer. In vehicles, when the vehicle door is closed against the vehicle body, the vehicle door and vehicle body can engage at a relatively high velocity. The door assembly described herein is configured to absorb or otherwise reduce a shock of a closing vehicle door against the vehicle body.

Referring to FIG. 1, a door assembly 200 includes the damping assembly 101 and the latching mechanism 102. The damping assembly includes a first damping component and a second damping component. The first damping component and the second damping component are configured to co-operate together in the shock absorbing state. In embodiments, the first damping component is a head component 106, and the second damping component is a jacket component 108 that are shown as placed on a vehicle 100. While FIG. 1 shows the door assembly 200 as a rear door assembly hingedly connected to a B-door pillar 203, the door assembly 200 may be used in conjunction with any door (front or rear) of the vehicle. In some embodiments, the door assembly 200 may also be used with a hatchback door or a sliding door of a vehicle.

As shown in FIG. 1, the head component 106 is placed on the vehicle door 210. The vehicle door 210 is shown to include an exterior panel 220 and an interior panel 230. Between the exterior panel 220 and the interior panel 230 is a shut face panel 240 that carries the head component 106. The shut face panel 240 may be any outer panel between the exterior panel 220 and the interior panel 230. Additionally, the shut face panel 240 also includes the latch assembly 120 that latches the vehicle door 210 to the C-pillar 207 of the vehicle body 205.

Still referring to FIG. 1, the jacket component 108 is placed on the pillar 207 of the vehicle body 205. The striker 122 that engages with the latch assembly 120 is also placed on the C-pillar 207.

When the vehicle door 210 of the vehicle 100 is brought near the pillar 207, the pre-selected length of the head component 106 engages with the jacket component 108 before the latch assembly 120 on the vehicle door 210 engages with the striker 122. While FIG. 1 shows the head component 106 on the vehicle door 210 and the jacket component 108 on the pillar 207 of the vehicle 100, some embodiments may have the head component 106 on the pillar 207 of the vehicle 100 and the jacket component 108 on the shut face panel 240 of the vehicle door 210. Further, in certain embodiments, the head component 106 and the jacket component 108 are placed externally on the vehicle door 210 and vehicle body 205. In some embodiments, the head component 106 and the jacket component 108 may at least partially placed on the exterior portion of the vehicle door 210 and vehicle body 205.

Referring to FIG. 2, an embodiment of the door assembly 200 is schematically depicted. While FIG. 1 depicts the door assembly 200 as placed on the vehicle 100, the door assembly 200 in FIG. 2 is shown in isolation. The door assembly 200 includes a damping assembly 101 and a latching mechanism 102. The damping assembly 101 includes the head component 106, the jacket component 108, a resistance member 111, an actuation valve 114, a fluid source 115, a first movable support 116, a second movable support 126 and casings 118 and 124. Additionally, as shown in FIG. 2, the latching mechanism 102 comprising the latch assembly 120 and a striker 122 is also depicted.

The door assembly 200 depicts the head component 106 having pre-selected length. The pre-selected length of the head component 106 may be selected such that the head component 106 engages with the jacket component 108 before the latch assembly 120 of the latching mechanism 102, engages with a striker 122 while the vehicle door 210 approaches the vehicle body 205. In some embodiments, the pre-selected length of the head component 106 is greater than a length of a latch assembly 120 such that the head component 106 engages with the jacket component 108 before the latch assembly 120 engages with a striker 122. While FIG. 2 shows the head component 106 placed externally on the vehicle door 210, in embodiments, the head component 106 may be placed partially within the vehicle door 210.

As shown in FIG. 2, the head component 106 may be placed on the vehicle door 210. In embodiments, the head component 106 is placed at or approximately along a centerline of gravity of the vehicle door 210. In certain embodiments, the head component 106 may be placed on a shut face panel 240 (as shown in FIG. 1) of the vehicle door 210. Further, the head component 106 may be encased in a casing 124. In certain embodiments, the head component 106 may be partially encased within the casing 124.

In some embodiments, the head component 106 is connected to a first movable support 116. The first movable support 116 is configured to allow limited movement of the head component 106 in a horizontal direction and/or a vertical direction (or movement along the x-axis or y-axis, as shown in FIG. 2). This movement facilitates engagement between the head component 106 and the jacket component 108 when the vehicle door 210 is brought near to the vehicle body 205. In certain embodiments, the movable support 116 may include a spring. In some embodiments, the movable support 116 may be placed in between the casing 124 and the head component 106. In certain embodiments, the damping assembly 101 may not have a first movable support 116.

Referring still to FIG. 2, the jacket component 108 is placed on the vehicle body 205. The jacket component 108 is placed in a way that it aligns with the head component 106, and is configured to receive the head component 106 at a pre-determined angle. The jacket component 108 has a first end 110 and a second end 112. The jacket component 108 is configured such that it receives the head component 106 at the first end 110. The jacket component 108 is shaped complimentary to the head component 106, so that the head component 106 is able to fully insert into the jacket component 108. By way of example only, as shown in FIG. 2, the head component 106 is shown to be a cylindrical rod, and therefore, the jacket component 108 is fashioned as a hollow cylindrical rod having a diameter slightly larger than that of the head component 106 such that the head component 106 may be fully insertable into the jacket component 108. That is, the head component 106 and the jacket component 108 are telescoped cylinders where the head component 106 fits within the jacket component 108.

As shown in FIG. 2, the jacket component 108 may be positioned in a way that the first end 110 is protruding out of the vehicle body 205, and the second end 112 is within the vehicle body 205. However, in some embodiments, the jacket component 108 may be placed completely within the vehicle body 205 with only the first end 110 exposed to be able to receive the head component 106. In other embodiments, the jacket component 108 may be placed externally on the vehicle body 205. In certain embodiments, the jacket component 108 may include a pneumatic valve, a hydraulic valve, an electronic valve, or a magnetic valve.

As shown in FIG. 2, the jacket component 108 may be placed within a casing 118. In some embodiments, the jacket component 108 may be partially encased within the casing 118. The casing 118 may include an alignment or lead-in structure 119 to facilitate alignment of the head component 106 and the jacket component 108.

As shown in FIG. 2, a resistance member 111 may be placed over the first end 110 of the jacket component 108. The resistance member 111 may be made of a material that is expandable or stretchable, so that the resistance member 111 includes a flexible cover that may stretch in a horizontal direction (or along the x-axis, as shown in FIG. 2). When the damping assembly 101 transitions from the initial state to the shock absorbing state (shown in FIGS. 5 and 6), the head component 106 pushes the resistance member 111 at the first end 110 into the jacket component 108 towards the second end 112 of the jacket component 108. The resistance experienced by the head component 106 as it enters into the first end 110 of the jacket component 108 allows the shock to be absorbed by the damping assembly 101. Additionally, the resistance member 111 is also useful in maintaining a pressure within the jacket component 108.

Further, as shown in FIG. 2, the door assembly 200 further includes an actuation valve 114. The actuation valve 114 is operably connected to the jacket component 108. In some embodiments, the actuation valve 114 is connected to the second end 112 of the jacket component 108. In some embodiments, the actuation valve 114 is configured to regulate and maintain a tunable pressure level within the jacket component 108, as the damping assembly 101 transitions from an initial state to the shock absorbing state. Based on the regulated pressure within the jacket component 108, the resistance experienced by the head component 106 as it is inserted into the jacket component 108 may be regulated. This resistance helps in absorbing the shock of the oncoming vehicle door 210 against the vehicle body 205. In some embodiments, the actuation valve 114 may be in communication with the fluid source 115 that can be used to recharge the jacket component 108 after use. In some embodiments, an actuation valve 114 may not be present.

Referring to FIG. 2, the damping assembly 101 also includes a second movable support 126, which is operably attached to the jacket component 108. The second movable support 126 allows the jacket component 108 to move in a horizontal and/or vertical direction (i.e. an x-axis and/or a y-axis direction as shown in FIG. 2). This allows for the jacket component 108 to suitably adjust itself while receiving the head component 106 at the first end 110. That is, the second movable support 126 allows flexibility in movement of the jacket component 108 into and out of the vehicle body 205 while the head component 106 engages with the jacket component 108. In some embodiments, the casing 118 may also be configured to move along with the jacket component 108. In an alternative embodiment, the second movable support 126 may include a spring. In some embodiments, the damping assembly 101 may not have a second movable support 126.

The door assembly 200 further includes the latching mechanism 102 having the latch assembly 120 placed on the vehicle door 210 and the striker 122 that is placed on the vehicle body 205. The latch assembly 120 is configured in a way that the latch assembly 120 engages with the striker 122 to fully close the vehicle door 210 against the vehicle body 205 only after the head component 106 has engaged with the jacket component 108. In some embodiments, it is possible for the damping assembly 101 to also function as a latching mechanism 102.

Figure 3:
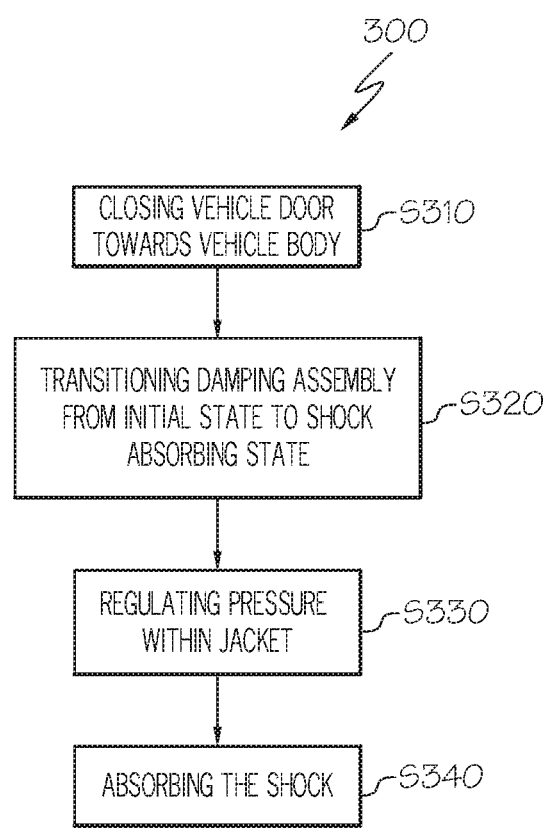
FIG. 3 is a flowchart depicting a method of absorbing a shock while closing the vehicle door against the vehicle body, according to one or more embodiments shown and described herein.

FIG. 3 discusses a method 300 of absorbing a shock while closing a vehicle door 210 against a vehicle body 205. While the method 300 discusses the shock being absorbed when the vehicle door 210 is closed against the vehicle body 205, the method 300 may also be used to close the hood, trunk, recorder, hatchback, or rear door of a vehicle 100 against the vehicle body 205. It is noted that, while the method 300 depicts steps following a specific sequence, additional embodiments of the present disclosure are not limited to any particular sequence.

In step S310, the vehicle door 210 is closed towards the vehicle body 205 with the damping assembly 101 in the initial state. In the initial state, the vehicle door 210 is in an open configuration, and the latching mechanism 102 is not engaged. Additionally, in embodiments, the head component 106 is not engaged with the jacket component 108 in the initial state.

In step S320, the damping assembly 101 transitions from the initial state to the shock absorbing state as the vehicle door 210 closes. In this step, the head component 106 of the damping assembly 101 approaches and engages with the jacket component 108. The transition from the initial state to the shock absorbing state occurs as the vehicle door 210 approaches the vehicle body 205. In embodiments, the damping assembly 101 is in the shock absorbing state when the head component 106 is received at the first end 110 of the jacket component 108. Further, the shock absorbing state may last until the head component 106 is fully inserted and reaches the second end 112 of the jacket component 108. In certain embodiments, the damping assembly 101 is in the shock absorbing state even when the head component 106 is partially inserted into the jacket component 108.

During the shock absorbing state, the vehicle door 210 is near the vehicle body 205, and the head component 106 is engaged with the jacket component 108. However, in embodiments, the latch assembly 120 is not in contact with the striker 122. Further, in embodiments, the latch assembly 120 engages with the striker 122 after the head component 106 has engaged with the jacket component 108. The latching mechanism may not latch the vehicle door 210 to the vehicle body 205 until the damping assembly 101 is in the shock absorbing state.

In step S330, pressure within the jacket component 108 is regulated by the actuation valve 114. By regulating the pressure within the jacket component 108, the head component 106 experiences resistance as the head component 106 engages with the jacket component 108 causing the damping assembly 101 to absorb the shock of the oncoming vehicle door 210 against the vehicle body 205. In some embodiments, the actuation valve 114 may be in communication with the fluid source 115 that can be used to recharge the jacket component 108 after use.

In step S340, the shock is absorbed when the damping assembly 101 is in the shock absorbing state. As the vehicle door 210 is brought to a predetermined angular position relative to the vehicle body 205, the damping assembly 101 transitions from the initial state, where the head component 106 is not in contact with the jacket component 108, into the shock absorbing state, where the head component 106 engages with the first end 110 of the jacket component 108, and inserts into the jacket component 108. The shock of the vehicle door 210 approaching the vehicle body 205 is absorbed as the head component 106 contacts the jacket component 108 and inserts into the jacket component 108.

The shock is absorbed by the damping assembly 101 while the vehicle door 210 is being closed against the vehicle body 205, and before the vehicle door 210 latches to the vehicle body 205 (i.e. the vehicle door 210 is still in the open configuration). That is, when the user closes the vehicle door 210, due to the pre-selected length of the head component 106, the head component 106 engages with the jacket component 108 at a pre-selected angle, before the latch assembly 120 engages with the striker 122 to latch the vehicle door 210.

Figure 4:
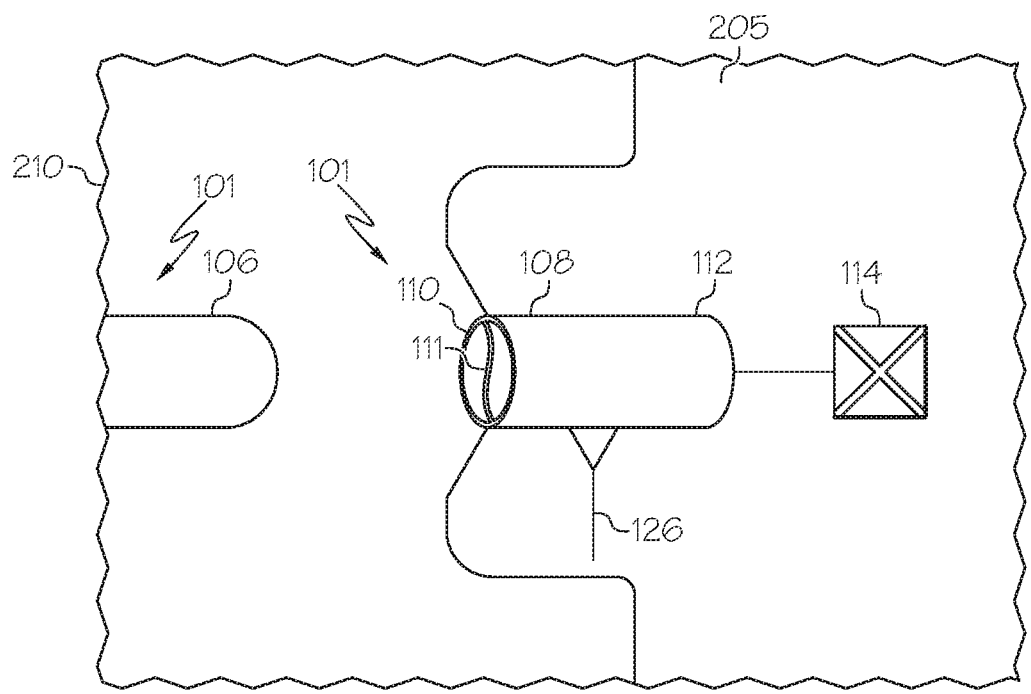
FIG. 4 depicts a damping assembly in an initial state, according to one or more embodiments show and described herein.

Now referring to FIG. 4, the initial state of the damping assembly 101 is shown. In the initial state, the vehicle door 210 is at a distance from the vehicle body 205 (i.e. the vehicle door 210 is in the open configuration). During the initial state, the vehicle door 210 is not in contact with the vehicle body 205, i.e. the head component 106 may be at a pre-determined distance from the first end 110 of the jacket component 108. Further, the head component 106 is not in contact with the jacket component 108.

Figure 5:
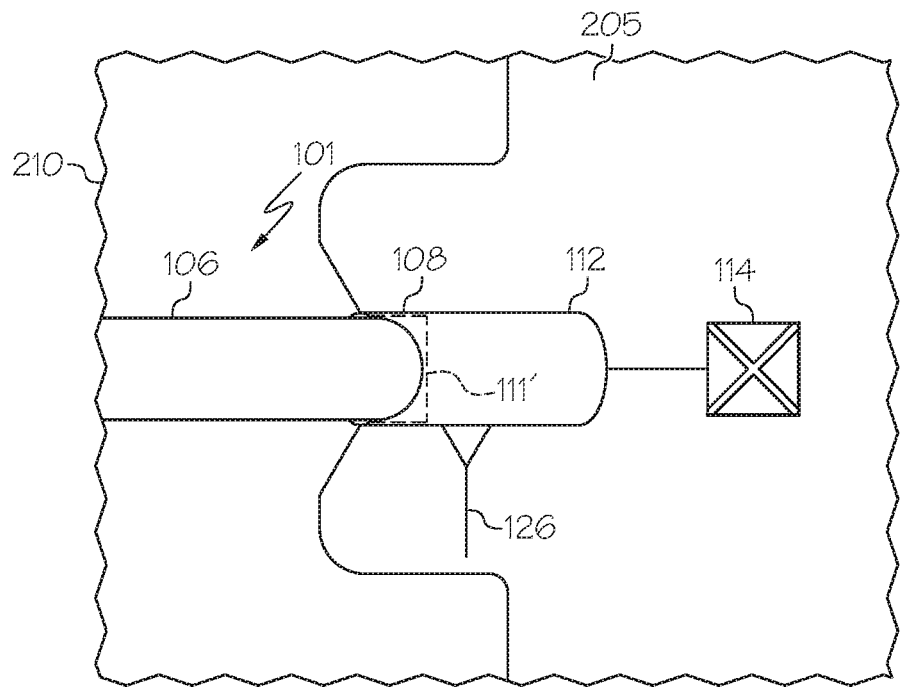
FIG. 5 depicts the damping assembly in a shock absorbing state, according to one or more embodiments shown and described herein.

FIG. 5 depicts the shock absorbing state where the head component 106 is engaged, or is in contact, with the jacket component 108. In this state, when the vehicle door 210 is brought near the vehicle body 205, the head component 106 of the damping assembly 101 engages with the jacket component 108. The head component 106 is placed on the shut face panel 240 (as shown in FIG. 1) in such a way that the jacket component 108 receives the head component 106 at a pre-determined angle, during the shock absorbing state. Further, the head component 106 engages with the jacket component 108 at its first end 110. In embodiments, the head component 106 engages with the resistance member 111 and pushes the resistance member 111 into the jacket component 108 towards the second end 112 of the jacket component 108. As shown in FIG. 5, the resistance member 111' at the first end 110 of the jacket component 108 is pushed into the jacket component 108 by the head component 106.

In embodiments, the actuation valve 114 is used to regulate the pressure within the jacket component 108. By changing the pressure within the jacket component 108, the impact by which the head component 106 engages with the first end 110 of the jacket component 108 is changed, thereby absorbing the shock of the vehicle door 210 when closed against the vehicle body 205. Therefore, due to the pressure within the jacket component 108, the shock of the vehicle door 210 is absorbed by the damping assembly 101 as the head component 106 engages, and pushes the resistance member 111 of the jacket component 108 at the first end 110 towards the second end 112.

Figure 6:
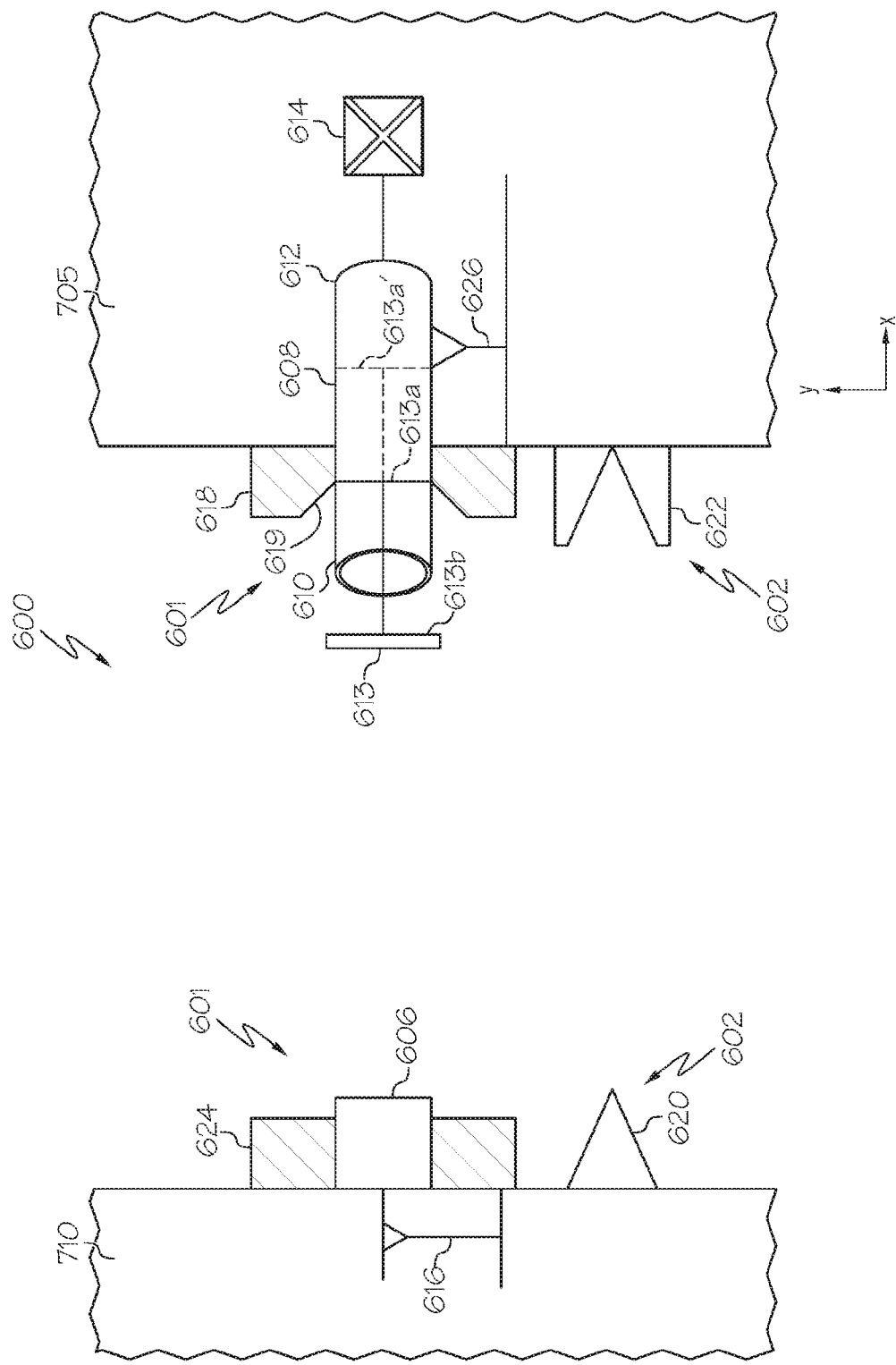
FIG. 6 depicts an alternative embodiment of the door assembly and its various components, according to one or more embodiments shown and described herein.

An alternative embodiment is shown in FIG. 6. Similar to the door assembly 200 described in FIG. 2, the door assembly 600 also includes a damping assembly 601, and a latching mechanism 602 placed on a vehicle door 710 and a vehicle body 705. The damping assembly 601 includes a head component 606, a jacket component 608, a first and a second movable support 616, 626, and casings 618, 624. Further, similar to FIG. 2, the latching mechanism 602 includes a latch assembly 620, and a striker 622. Further, in FIG. 6, the resistance member 111 (shown in FIG. 2) placed at the first end 610 of the jacket component 608 may be replaced with a piston member 613. Additionally, the pre-selected length of the head component 606 may be reduced as compared to the head component 106 depicted in FIG. 2. The piston member 613 has an interior end 613a, which is configured to fit within the jacket component 608, and an exterior end 613b, which is outside of the jacket component 608. The piston member 613 is configured to move in a horizontal direction or along the x-axis such that when the head component 606 presses against the exterior end 613b of the piston member 613, the interior end 613a moves from a position 613a that is closer to the first end 610 of the jacket component 608, to a position 613a' (shown in dotted lines) that is closer to the second end 612 of the jacket component 608. Further, in certain embodiments, the jacket component 608 with the piston member 613 may be placed on the vehicle door 710, and the head component 606 may be placed on the vehicle body 705. In embodiments, resistance may be experienced by the head component 606 when engaged with the jacket component 608, in moving the piston member 613 further towards the second end 612 of the jacket component 608. In an alternative embodiment, the resistance experienced by the head component 606 in pushing the piston member 613 towards the second end 612 may be due to pressure within the jacket component 608 regulated by the actuation valve 614.

In alternative embodiments, a fluid (gas or liquid) may be placed within the jacket component 608. The pressure of the fluid within the jacket component 608 may be regulated by the actuation valve 614. In some embodiments, grooves may be provided within the inside of the jacket component 608 to ensure smoother movement of the piston member 613 inside the jacket component 608.

It should be understood that the embodiments disclosed herein include apparatus, methods and vehicles for door assemblies for vehicles that have a damping assembly and a latch assembly, where the damping assembly is configured to absorb a shock as the damping assembly transitions from an initial state to a shock absorbing state while the vehicle door closes against the vehicle body before the latch assembly latches the vehicle door to the vehicle body. By absorbing the shock of the vehicle door when closed against the vehicle body, damage or fracturing of the vehicle body is prevented.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A door assembly of a vehicle comprising:
    a damping assembly comprising a damping component arranged on a shut face panel of a vehicle door; and
    a latch assembly arranged on the shut face panel of the vehicle door;
    wherein the damping assembly is configured to absorb a shock as the damping assembly transitions from an initial state to a shock absorbing state while the vehicle door closes against a vehicle body before the latch assembly latches the vehicle door to the vehicle body;
    wherein the damping component comprises a head component that extends outwardly from the shut face panel a pre-selected length and configured to be received by a jacket component in the shock absorbing state, the jacket component extending outwardly from an outer panel of the vehicle body facing the shut face panel with the vehicle door in a closed configuration such that the head component and the jacket component engage before the latch assembly latches the vehicle door to the vehicle body, wherein the head component and the jacket component are each placed within a casing, and wherein the casing of the head component surrounds at least a portion of the head component.

2. The door assembly of claim 1, wherein the damping assembly is in the shock absorbing state when the head component is in contact with a first end of the jacket component.

3. The door assembly of claim 1, wherein the damping assembly is in the initial state when the head component is at a pre-determined distance from a first end of the jacket component.

4. The door assembly of claim 1, wherein the pre-selected length of the head component prevents the latch assembly from latching the vehicle door to the vehicle body before the damping assembly is in the shock absorbing state.

5. The door assembly of claim 2, wherein the head component contacts the first end of the jacket component at a pre-determined angle.

6. The door assembly of claim 1, further comprising:
    a movable support attached to the jacket component that allows the jacket component to move in a horizontal direction from an interior portion of the vehicle body to an exterior portion of the vehicle body.

7. The door assembly of claim 1, wherein the jacket component has a resistance member placed at a first end of the jacket component.

8. The door assembly of claim 7, wherein shock is absorbed by the head component as the head component pushes the resistance member into the jacket component at the first end of the jacket component, and towards a second end of the jacket component.

9. A method of absorbing the shock while closing the vehicle door against the vehicle body with the door assembly of claim 1 comprising:

closing the vehicle door towards the vehicle body with the damping assembly in the initial state;

transitioning the damping assembly from the initial state to the shock absorbing state as the vehicle door closes; and absorbing the shock with the damping assembly in the shock absorbing state;

wherein the shock is absorbed while the vehicle door is being closed against the vehicle body, and before the latch assembly latches the vehicle door to the vehicle body.

10. The method of claim 9, wherein the head component having the pre-selected length is received by a first end of the jacket component at a pre-determined angle.

11. The method of claim 9, further comprising:

regulating a pressure within the jacket component using an actuation valve, wherein a regulation of pressure assists in absorbing the shock.

12. A vehicle with a door assembly comprising:

a vehicle body; and at least one vehicle door, wherein the door assembly comprises:

a damping assembly comprising a damping component arranged on a shut face panel of the vehicle door; and a latch assembly arranged on the shut face panel of the vehicle door;

wherein the damping assembly is configured to absorb a shock as the damping assembly transitions from an initial state to a shock absorbing state while the vehicle door closes against the vehicle body before the latch assembly latches the vehicle door to the vehicle body;

wherein the damping component comprises a head component that extends outwardly from the shut face panel a pre-selected length and configured to be received by a jacket component in the shock absorbing state, the jacket component extending outwardly from an outer panel of the vehicle body facing the shut face panel with the vehicle door in a closed configuration such that the head component and the jacket component engage before the latch assembly latches the vehicle door to the vehicle body, and wherein the door assembly further comprises an actuation valve to regulate a pressure within the jacket component.

13. The vehicle of claim 12, wherein the damping assembly is in the shock absorbing state when the head component is in contact with a first end of the jacket component.

14. The vehicle of claim 12, wherein the damping assembly is in the initial state when the head component is at a pre-determined distance from a first end of the jacket component.

* * * * *